United States Patent Office 3,446,677
Patented May 27, 1969

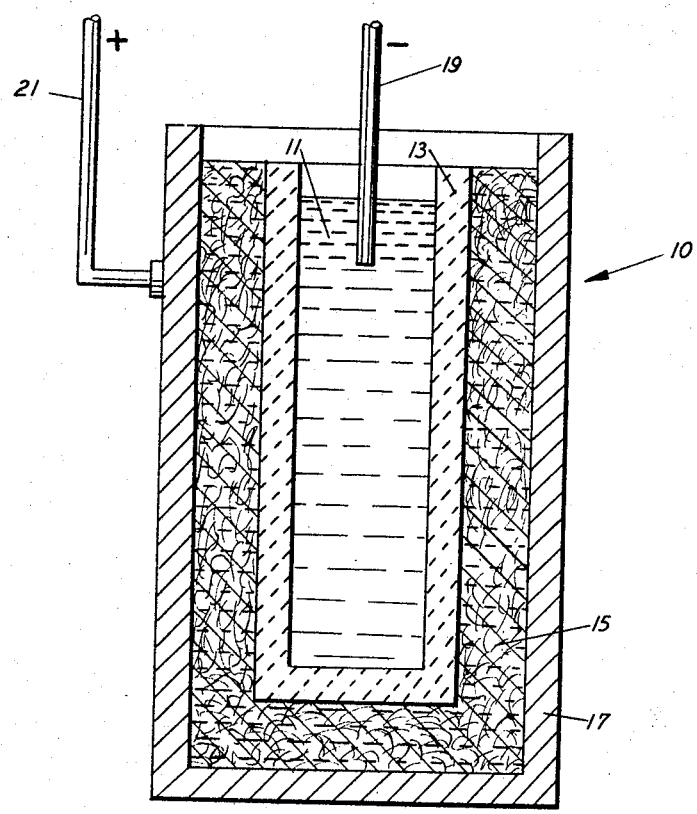
GERALD J. TENNENHOUSE
INVENTORS
BY John R. Faulkner
Olin B. Johnson
ATTORNEYS

3,446,677
METHOD OF MAKING A SOLID IONIC CONDUCTOR
Gerald J. Tennenhouse, Oak Park, Mich., assignor to Ford Motor Company, Dearborn, Mich., a corporation of Delaware
Filed Nov. 21, 1966, Ser. No. 595,702
Int. Cl. H01m 43/06; C03c 17/00; C04b 35/42
U.S. Cl. 136—153                     5 Claims This invention relates to a method for manufacturing cationically-conductive crystalline material comprising a structural lattice and cations that migrate in relation thereto under influence of an electric field. In particular, this invention is concerned with a method for producing such crystalline materials having potassium as the mobile ion.

Cationically-conductive crystalline materials prepared from metal oxides can be employed as solid electrolytes in a variety of electrical and/or electrochemical devices and processes and are particularly suitable for use as half-cell separators in electrochemical cells employing an alkali metal reactant. Those having potassium ion as the conductive ion are of value both in such form as ionic conductors of potassium ion and as intermediates from which other ion conductors can be prepared by ion substitution.

One type of crystalline material suitable for these uses is a crystal having a structural lattice comprising ions of aluminum and oxygen in crystal lattice combination and alkali metal cations which migrate in relation to such lattice when a difference of electrical potential is provided on opposite sides of the lattice. Such metals may be prepared from $Al_2O_3$ and $Na_2O$, e.g. $Na_2O \cdot 11Al_2O_3$, and may be modified by substitution of certain other cations for the sodium ion. These materials, their preparation, and certain uses therefor are described by Joseph T. Kummer and Neill Weber in U.S. patent application Ser. No. 563,938, filed May 2, 1966 and now Patent No. 3,404,036. Another type of cationically-conductive crystalline material in this field is the multi-metal oxide crystals which consist essentially of a major proportion of ions of aluminum and oxygen and a minor proportion of ions of a metal having a valence not greater than 2, e.g. lithium and/or magnesium, in crystal lattice combination and alkali metal cations which migrate in relation to such lattice under influence of an electric field. Both such materials have been prepared initially with sodium ion employed as the conductive ion.

Most larger cations cannot be directly substituted for sodium ion in crystals of the types herein described. The temperatures required to sinter such crystals into objects of desired shape and size render disadvantageous direct preparation of such materials having potassium a sthe mobile ion. Attempts to prepare crystalline objects having potassium as the mobile ion by methods used to produce the sodium embodiment have produced poorly sintered, relatively porous materials having relatively high electrical resistivities. It is difficult to achieve liquid phase substitution by conventional methods at reasonable exchange rates without placing undue stress upon the crystalline structure.

This invention is concerned with an improved method for the exchange of potassium ion for sodium ion in crystalline materials of the types herein described. In the method of this invention, the sodium ion-containing crystal or polycrystalline object formed therefrom is contacted at temperatures above about 900° C., advantageously between about 1000° C. and about 1400° C., with potassium ion.

In a second embodiment, the crystalline object is heated to such temperature in an enclosed substitution zone and maintained in contact with potassium ion in vapor phase until at least about 50 percent of the sodium ions have been replaced by potassium ion. After this the remainder of potassium ion substitution may be effected by immersing the object in a liquid source of potassium ion, e.g. a molten, ion-yielding potassium salt.

In a second embodiment, the crystalline object is heated to such temperature and contacted with a liquid source of potassium ion which has been heated to like temperature.

The potassium ion exhibits a greater affinity for the crystalline structure than does the sodium ion and is present in concentrations sufficient to effect substantially complete substitution. Since an equilibrium situation is involved, the concentration of potassium ion should be in excess of that of sodium ion.

The accompanying schematic drawing illustrates one embodiment of a cell for generating electrical energy which utilizes as the half-cell separator thereof, a potassium ion-containing tube which is a product of the instant method.

This invention will be more fully understood from the following examples.

EXAMPLE 1

A mixture containing 9.75 weight percent $Na_2O$ (introduced as $Na_2CO_3$), 3.92 weight percent MgO, and 86.33 weight percent $Al_2O_3$ was shaken mechanically for 30 minutes, heated at 1,250° C. for one hour, mixed with a wax binder, and pressed into cylindrical pellets. The pellets were isostatically pressed at 90,000 p.s.i. The binder was removed by gradually raising the temperature of the pellets to 550° C. The pellets were then sintered in an electric furnace at a temperature of 1550° C. for about 2 hours. During sintering, the pellets were kept in a covered crucible which also contained $Na_2O \cdot Al_2O_3$ packing powder.

A sample pellet was placed in a clean platinum crucible. The open crucible was placed on a bed of dry

$$K_2O \cdot Al_2O_3$$

in a larger platinum crucible. The larger crucible was covered and heated at 1,380° C. for 64 hours. After cooling, the sample pellet was washed briefly in water and dried. The density of the resultant pellet was found to be 2.92.

The opposing flat faces of this pellet were painted with a solution of AgI in ethylenediamine solution. The pellet was then heated to 400° C. to remove the ethylenediamine leaving AgI as a smooth adherent layer. The AgI was then covered with a layer of silver paint to insure good electrical contact. The resistance of the sample was then measured at 300° C. using 1.5 mc. alternating current and the resistivity calculated. The pellet exhibited resistivity of 22.1 ohm-cm. This pellet was next abraded to remove the silver paint and silver iodide electrodes and crushed. An X-ray diffraction powder pattern was obtained from this material using a cobalt tube (X-ray wavelength of about 1.7902 A.). This compound demonstrated several peaks common with those of the corresponding pattern of $Na_2O \cdot 11Al_2O_3$ but was characterized by peak at 53.5°–54.0°. Sodium beta-alumina, $Na_2O \cdot 11Al_2O_3$, in this test is characterized by peaks at 52°–53° and at 55°–56° but does not demonstrate such a peak at 53.5°–54.5°. Elemental analysis of the crushed pellet revealed the following constituents: 11.80 weight percent $K_2O$, 1.14 weight percent $Na_2O$, and a balance of $Al_2O_3$.

EXAMPLE 2

Sodium-containing sintered pellet of Example 1 was placed in a first crucible as in the preceding example and placed upon a bed of dry KCl in a larger crucible. The larger crucible was covered and heated at 1,100° C. for 3 hours. This pellet was then placed in molten $KNO_3$ at 400° C. for 16 hours and then reheated in KCl vapor at 1,100° C. for 3 hours. The sample was washed with water and dried. The density of this pellet was measured and found to be 2.75. Resistance measurement of this pellet was made in the same manner as in the preceding example and the electrical resistivity of the pellet calculated. The resistivity of this pellet at 300° C. was 8.26 ohm-cm. The sample was crushed as in the preceding example. The X-ray diffraction powder pattern revealed the material had the same type crystalline structure as the potassium-containing pellet of Example 1. Elemental analysis of this pellet revealed the following constituents: $K_2O$, 12.76 weight percent; $Na_2O$, 0.66 weight percent; and a balance of $Al_2O_3$.

EXAMPLE 3

Sodium ion-containing sintered crystal pellets were prepared as in Example 1 from 10 weight percent $Na_2O$ (introduced as $Na_2CO_3$) and 90 weight percent $Al_2O_3$. The procedure of potassium ion substitution was then carried out on separate representative pellets using the procedures of Example 2 with a sole difference being that the substitution was terminated after the step of emersion in molten $KNO_3$ which in this instance was extended for 20 hours.

EXAMPLE 4

A sodium ion-containing pellet was prepared by the method of Example 1 and sintered at 1,560° C. The pellet, in the shape of a circular disc 12 mm. in diameter and 3 mm. thick was placed in a clean platinum crucible which was placed on a bed of dry KCl in a large platinum crucible. The large crucible was covered and heated at 1,800° F. (about 982° C.) for 45 minutes and the temperature was then raised to 2,100° F. (about 1,149° C.) for 15 minutes.

After cooling, the pellet was placed in 500 ml. 2 Normal HCl at 80° C. for 18 hours. After air drying, the pellet was found to have a density of 3.01. The pellet was slowly heated to 300° C. to dehydrate same.

The electrical resistivity of the resulting pellet was determined as in the preceding examples. The resistivity of this pellet at 300° C. was found to be 352 ohm-cm. Elemental analysis of the pellet revealed that substantially all of the sodium and potassium had been displaced.

EXAMPLE 5

Sodium ion-containing sintered crystal pellets were prepared as in Example 1 from the same materials in the same relative concentrations.

A sample pellet was subjected to ion exchange in the same manner as in Example 1 using KCl as the source of potassium ion. Substitution was effected at 1,100° C. for 4 hours.

The resultant sample was crushed and subjected to elemental analysis which revealed that about 68–69 percent of the sodium ions in the pellet had been replaced by potassium ions.

EXAMPLE 6

Sodium ion-containing sintered crystal pellets prepared as in Example 1 are heated to about 1,050° C. Potassium sulfate is heated to this temperature and the pellets are immersed in the liquid potassium sulfate. This temperature is maintained for about 6 hours and the resultant potassium ion-containing pellets removed from the liquid.

EXAMPLE 7

Referring now to the drawing, there is shown a cell 10 which may be one unit of a plurality of cells electrically connected in series and/or parallel forming a battery. In this embodiment, an anode-reactant, molten potassium 11, is shown within a potassium ion-containing tube 13. In contact with the exterior of tube 13 is a porous conductor 15 immersed in a sulfur-comprising, cathodic reactant-electrolyte. Encasing both 13 and 15 is a metal case, cathode 17. Inside tube 13 in contact with the molten potassium 11 is a conductor 19, e.g. platinum wire, which serves as the negative lead to an external circuit, not shown, which includes a resistance, e.g., a light bulb, D.C. motor, etc., and is in electrical connection with a positive lead, conductor 21. Lead 21 is in electrical contact with cathode 17. The cell may be operated under a blanket of inert gas or suitably sealed by a cover, not shown. The potassium atoms of the anode-reactant 11 yield electrons to the conductor 19 and pass as ions through tube 13 to the cathodic reactant, e.g. $K_2S_5$ in 15. Sulfur atoms within 15 accept electrons from the external circuit via cathode 17 and the porous conductor of 15.

The porous conductor of 15 may be fibrous sheet material fabricated from graphite or carbon fibers and woven into cloth or felted, porous carbon plates, etc. One example of such materials is disclosed by Lauzos et. al. in U.S. Patent 3,214,647.

The metal cathode 17 should be formed of a metal or alloy that resists attack by the sulfur-comprising cathodic reactant, e.g. aluminum lined or coated with chromium, titanium, chromel, etc.

The tube 13 is prepared in the same manner as the pellets of the preceding examples except that the crystals and wax binder are packed into a mold of corresponding shape prior to compression, e.g. between a tubular rubber mold and a metal core.

It is to be understood that this invention is not limited to the examples herein shown and described, but that changes and modifications may be made without departing from the spirit and scope of the invention, as defined in the appended claims.

I claim:
1. An improved method for substituting potassium ions for sodium ions in a crystalline structure comprising a structural lattice and sodium ions which migrate in relation to said lattice under influence of an electric field, at least a major proportion of said lattice consisting of ions of aluminum and oxygen in crystal lattice combination, said method comprising heating said crystalline structure to a temperature in excess of about 900° C. contacting said structure with a source of potassium ion heated to a temperature above about 900° C. and essentially equal to the temperature of said crystalline structure, and maintaining said structure and said source of potassium ion at a temperature above about 900° C. until at least about 50% of the sodium ions in said structure are replaced by potassium ions.
2. The method of claim 1 wherein said source of potassium ion is in vapor state and said substitution is effected with an enclosed substitution zone.
3. The method of claim 1 wherein said source of potassium ion is in liquid state.
4. The method of claim 1 wherein at least 50% of said substitution is effected with a source of potassium ion in vapor state and additional substitution is effected by contacting said structure with a source of potassium ion in liquid state.
5. The method of claim 1 wherein said substitution is carried out at a temperature in the range of about 1,000° to about 1,400° C.

References Cited

UNITED STATES PATENTS 3,404,036  10/1968  Kummer et al. _____ 136—6

ALLEN B. CURTIS, *Primary Examiner.*

D. L. WALTON, *Assistant Examiner.*

U.S. Cl. X.R.

65—30; 106—46, 65; 136—83.